United States Patent
Geusz et al.

(10) Patent No.: US 11,159,511 B1
(45) Date of Patent: Oct. 26, 2021

(54) AUTHENTICATION PROTOCOL MANAGEMENT

(71) Applicant: MicroStrategy Incorporated, Vienna, VA (US)

(72) Inventors: Darrell Geusz, Sterling, VA (US); Deepak Karuppiah, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 299 days.

(21) Appl. No.: 16/244,533

(22) Filed: Jan. 10, 2019

(51) Int. Cl.
*H04L 29/06* (2006.01)
*H04L 9/32* (2006.01)

(52) U.S. Cl.
CPC ........ *H04L 63/0815* (2013.01); *H04L 9/3213* (2013.01); *H04L 63/062* (2013.01); *H04L 63/10* (2013.01)

(58) Field of Classification Search
CPC ... H04L 63/0815; H04L 63/10; H04L 9/3213; H04L 63/062
See application file for complete search history.

(56) References Cited

U.S. PATENT DOCUMENTS

| 6,604,198 | B1 | 8/2003 | Beckman et al. |
| 7,370,351 | B1 | 5/2008 | Ramachandran et al. |
| 7,568,218 | B2 | 7/2009 | Garg et al. |
| 7,617,522 | B2 | 11/2009 | Schmidt et al. |
| 7,657,639 | B2 | 2/2010 | Hinton |
| 7,721,106 | B2 | 5/2010 | Zhang |
| 8,528,063 | B2 | 9/2013 | Duggan |

(Continued)

FOREIGN PATENT DOCUMENTS

WO WO2002039237 5/2002

OTHER PUBLICATIONS

Tagg, "Implementing a Kerberos Single Sign-on Infrastructure", 2000, [retrieved on Apr. 8, 2019], retrieved from: URL<https://pdfs.semanticscholar.org/ee5a/69d86aa2d3d5f1d855c3e36ba778f73a3241.pdf>, 12 pages.

(Continued)

*Primary Examiner* — Huan V Doan
(74) *Attorney, Agent, or Firm* — Fish & Richardson P.C.

(57) ABSTRACT

Methods, systems, and apparatus, including computer-readable media, for authentication protocol management. In some implementations, a computing device receives data indicating a current context of a client device associated with a particular user. The computing device accesses first authentication data that demonstrates that the particular user has been authenticated using a first authentication protocol. The computing device determines that the particular user is likely to request access to a secured resource based on the current context of the client device and data indicating one or more previous resource accesses by the particular user. The computing device determines that access to the secured resource involves authentication using a second authentication protocol that is different from the first authentication protocol. In response, the computing device authenticates the particular user using the second authentication protocol and establishes an authenticated session for the particular user to access the secured resource.

20 Claims, 3 Drawing Sheets

(56) References Cited

U.S. PATENT DOCUMENTS

| | | | |
|---|---|---|---|
| 8,607,306 B1* | 12/2013 | Bridge | H04L 63/08 726/1 |
| 9,560,036 B2 | 1/2017 | Hinton et al. | |
| 9,571,476 B1* | 2/2017 | Silhavy | G06F 21/6227 |
| 2003/0188193 A1* | 10/2003 | Venkataramappa | H04L 63/0807 726/10 |
| 2006/0021018 A1* | 1/2006 | Hinton | H04L 63/06 726/10 |
| 2007/0245013 A1 | 10/2007 | Saraswathy et al. | |
| 2011/0302412 A1 | 12/2011 | Deng et al. | |
| 2013/0254847 A1 | 9/2013 | Adams et al. | |
| 2017/0142094 A1 | 5/2017 | Doitch et al. | |
| 2017/0147796 A1* | 5/2017 | Sardesai | H04L 67/14 |
| 2017/0155640 A1 | 6/2017 | Rykowski et al. | |
| 2018/0012232 A1* | 1/2018 | Sehrawat | G06F 21/31 |
| 2020/0145385 A1* | 5/2020 | Chauhan | H04L 63/0428 |
| 2020/0380112 A1* | 12/2020 | Allen | G06N 5/006 |

OTHER PUBLICATIONS

Redhat.com [online], "11.5 Setting up Cross-Realm Kerberos Trusts," available on or before Apr. 8, 2019, via Internet Archive: Wayback Machine URL<https://web.archive.org/web/20190408205002/https://access.redhat.com/documentation/en-us/red_hat_enterprise_linux/7/html/system-level_authentication_guide/using_trusts>, [retrieved on Apr. 8, 2019], retrieved from: URL<https://access.redhat.com/documentation/en-us/red_hat_enterprise_linux/7/html/system-level_authentication_guide/using_trusts>, 8 pages.

Docs.microsoft.com [online], "Use Kerberos for single sign-on (SSO) from Power BI to on-premises data sources," Oct. 9, 2018, [retrieved on Apr. 8, 2019], retrieved from: URL<https://docs.microsoft.com/en-us/power-bi/service-gateway-sso-kerberos>, 26 pages.

Wikipedia.org [online], "Single sign-on," Apr. 6, 2019 [retrieved on Apr. 8, 2019], retrieved from: URL<https://en.wikipedia.org/wiki/Single_sign-on>, 6 pages.

Wikipedia.org [online], "Active Directory Federation Services," Mar. 20, 2019, [retrieved on Apr. 8, 2019], retrieved from: URL<https://en.wikipedia.org/wiki/Active_Directory_Federation_Services>, 3 pages.

Docs.microsoft.com [online], "Deploying Active Directory Federation Services in Azure," Oct. 27, 2018, [retrieved on Apr. 8, 2019], retrieved from: URL<https://docs.microsoft.com/en-us/windows-server/identity/ad-fs/deployment/how-to-connect-fed-azure-adfs>, 30 pages.

Shyamsundar, "What is ADFS," Jun. 21, 2018, [retrieved on Apr. 8, 2019], retrieved from: URL<https://www.okta.com/blog/2018/06/what-is-adfs/>, 8 pages.

Docs.safe.com [online], "Single Sign-On Authentication Failure (Cross-Domain User)," available on or before Apr. 8, 2019, via Internet Archive: Wayback Machine URL<https://web.archive.org/web/20190408212732/https://docs.safe.com/fme/html/FME_Server_Documentation/AdminGuide/SSO_Authent_Failure_Cross_Domain_User.htm>, [retrieved on Apr. 8, 2019], retrieved from: URL<https://docs.safe.com/fme/html/FME_Server_Documentation/AdminGuide/SSO_Authent_Failure_Cross_Domain_User.htm>, 2 pages.

* cited by examiner

AUTHENTICATION PROTOCOL MANAGEMENT

BACKGROUND

This specification relates generally to authentication protocol management.

Electronic devices may access various resources, such as files, databases, web pages, applications, services, and so on. Resources may use various techniques to authenticate users before access is allowed. Different resources may require different authentication steps or protocols in order to obtain access.

SUMMARY

In some implementations, a protocol management system provides a single-sign-on (SSO) capability across multiple authentication protocols. For example, a management server can provide a layer of abstraction to manage authentication for a user to access many resources, regardless of the specific authentication protocol required by the individual resources. As a result, the management server can automatically obtain and maintain authenticated sessions on behalf of a user across multiple authentication protocols. This allows the management server to provide a bridge for authentication across network domains and to extend authentication from one resource or protocol to acquire authentication for another resource or protocol.

The management system can manage authentication on behalf of a user so the user does not need to manually log in to individual services, even outside the user's local network domain. In some conventional network arrangements, a user can obtain access to services in a local network using an authentication protocol, such as Kerberos. However, access to additional services outside the local network may require the user to sign in to each of the additional services, often with separate credentials and separate authentication protocols. With the protocol management system discussed herein, the user only has to sign in using the protocol management system, and the system will dynamically obtain access to each of the requested services, whether within the local network or on the Internet. The user provides credentials to the protocol management system, and the protocol management system takes the steps necessary to give the user access to the requested service.

In some implementations, the user may request for access to a service that does not exist on the local network. In particular, this service may be accessed over the Internet or on another third party network. Additionally, in order for the user to access this service, the user may need to communicate using a different protocol than that of the user's first protocol. The user can request access to the external service using the protocol management system. As such, the protocol management system orchestrates the gathering and retrieving of the necessary requirements to access the external service using the different protocol.

In particular, the protocol management system can orchestrate the translation of the user's protocol to another protocol corresponding to the requested service. The protocol management system analyzes the received request from the user in order to authenticate and authorize access for the user. If the user passes the authentication and authorization test, the protocol management system determines the necessary information required to translate the received protocol into the service's protocol in order to provide the necessary information to the requested service using the service's protocol. If the requested service authenticates access for the user, the requested service will transmit an indication of an authentication session to the protocol management system, and subsequently, to a client device of the user.

The protocol management system provides a transparent protocol translation process. The management system can obtain authentication for a user for an additional protocol without any indication to the user that another protocol is necessary to access the requested service. In this regard, the protocol management system automatically translates the user's protocol to another protocol in a transparent manner in order to request for an authenticated session to the service on the user's behalf. This transparent translation improves the login process efficiency because the user is no longer required to manually login to each new service. Additionally, the user is no longer required to change communication protocols to access the new service. As a result, the user is only required to login one time using one protocol to access any service in the protocol management system.

The protocol management system combines identity management with an adaptive protocol switch. A user can be recognized from a request for a particular service and an identity of the user can be associated with one or more services. The protocol management system can recognize a user from an identifier found in the request or based on a type of the request, for example. The service can be recognized based previous requests sent by the same user, techniques utilized by the protocol management system that predict services that the user may request, or one or more services found in the user's request, to name a few examples. Additionally, the protocol management system can identify the protocol used by the user. Based on the identified user and the request, the protocol management system can determine whether to employ adaptive protocol switching. The adaptive protocol switching seeks to utilize the identified protocol in the request and efficiently switch to a protocol required for communicating with the determined service. The protocol management system can learn to adaptively switch between two protocols from previous login attempts, learning to switch between two different protocol types while the system is offline, or receiving instructions on how to switch between two protocol types. Thus, when the protocol management system is online and receives a request from a user using a protocol type, the protocol management system can adaptively switch the protocol types to access a service requested for by the user with minimal delay time.

A multi-factor enablement layer may be provided by the protocol management system for a user requesting access to a particular service. In order to ensure a secure environment, the protocol management system may require the user to provide an additional method of authentication using one or more protocols. Additionally, the protocol management system may require the user to authenticate using various devices to prove the user's identity. In some implementations, the protocol management system may perform multi-factor enablement on a routine basis (e.g., daily, weekly, monthly, etc.).

The protocol management system may dynamically provide a user access to one or more services based on telemetry, context, and behavior analysis of the user. The protocol management system may pre-allocate protocol translations for a user based on the telemetry, context, and the behavior of the user. For example, if the user is traveling from one location to another, the protocol management system may automatically translate the typical protocol for a user (e.g., Kerberos) to another protocol so that the user can access a video messaging application, such as SKYPE. The protocol management system may provide the translated protocol and required information to the video messaging application so the user automatically has access to the video messaging application upon logging in to the protocol management system.

A user's access to a service based on a GPS location of the user may be granted or denied. For example, the protocol management system can deny a user's access to a requested service found only in South America, when the user's GPS indicates his location is in Asia. In some implementations, the protocol management system may analyze the context of the user to determine whether to grant or deny access to the user. For example, context can include time of day, type of device, and type of protocol being used to request service. In some implementations, the protocol management system may analyze the behavior of the user to determine whether to grant or deny access to the protocol management system. For example, the behavior can include frequency of previous use of the requested service, previous lengths of time for using the requested service, and whether or not the user has previously used the service past his or her ticket duration time.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

In one general aspect, a method includes: receiving, by the one or more computers, data indicating a current context of a client device associated with a particular user; accessing, by the one or more computers, first authentication data that demonstrates that the particular user has been authenticated using a first authentication protocol; determining, by the one or more computers, that the particular user is likely to request access to a secured resource based on the current context of the client device and data indicating one or more previous resource accesses by the particular user; determining, by the one or more computers, that access to the secured resource involves authentication using a second authentication protocol that is different from the first authentication protocol; in response to determining that the particular user is likely to request access to a secured resource and based on the first authentication data demonstrating that the particular user has been authenticated using the first authentication protocol: authenticating, by the one or more computers, the particular user using the second authentication protocol; and establishing, by the one or more computers, an authenticated session for the particular user to access the secured resource.

Implementations may optionally include one or more of the following features. For example, in some implementations, providing, by the one or more computers, session data to the client device that enables the client device to access the secured resource using the authenticated session.

In some implementations, the method includes: receiving a Kerberos ticket for an authenticated Kerberos session of the particular user in a local area network domain; and the secured resource is a resource outside the local area network domain.

In some implementations, the method includes: determining that access to the secured resource includes authentication using at least one of Open Authentication protocol, Security Assertion Markup Language (SAML), OpenID connect (OIDC), JSON Web Tokens (JWT), or Open Web Application Security Project (OWASP).

In some implementations, the secured resource includes a data source, a document, a web page, a network-based application, a network-based service, or a remote computer system.

In some implementations, the first authentication data includes a Kerberos ticket, from a Kerberos key distribution center, that is currently valid, the Kerberos ticket being stored by the one or more computers on behalf of the client device; the second authentication data for the particular user includes at least one of biometric data, a user name, a user account identifier, a device identifier for the client device, a password, a personal identification number, a code, or a data token.

In some implementations, the method includes: determining that the secured resource is outside a domain of the client device, the one or more computers, or the KDC; and determining, based on a stored profile for the secured resource or communication with the secured resource, that the first authentication protocol is not supported by the secured resource but the second authentication protocol is supported by the secured resource, or determining, based on a management profile, that a management policy directs use of the second authentication protocol in addition to requirements of the secured resource.

In some implementations, the method includes: authenticating the particular user using the second authentication data includes providing the second authentication data before receiving the request from the client device to access the secured resource. The method further includes: before receiving the request from the client device to access the secured resource: establishing the authenticated session for the particular user with the secured resource; storing session data describing the authenticated session for the particular user to access the secured resource; and providing the session data to the client device further including, providing, to the client device and in response to receiving the request for access to the secured resource, the stored session data that enables the client device to access the secured resource using the authenticated session established before the request from the client device to access the secured resource.

In some implementations, the method includes: communicating with multiple different services to establish authenticated sessions for the particular user for each of the different services without user action to initiate access to the multiple different services, the multiple different services using different authentication protocols; and storing authentication tokens for the authentication sessions and maintaining the authentication sessions active while a Kerberos authentication for the particular user in a local area network domain remains active.

In some implementations, the method includes: determining that authentication of the particular user for the first authentication protocol or the second authentication protocol expires within a threshold amount of time; and based on determining that authentication of the particular user for the first authentication protocol or the second authentication protocol expires within the threshold amount of time, automatically renewing the authentication of the particular user for the first authentication protocol or the second authentication protocol.

In some implementations, the method includes: determining that the authenticated session of the particular user for the first authentication protocol has ended; and based on determining that the authenticated session of the particular user for the first authentication protocol has ended, ending the authenticated session of the particular user for the secured resource that was obtained using the second authentication protocol.

In some implementations, the method includes: receiving a request from the client device to access the secured resource; in response to receiving the request from the client device to access the secured resource, accessing a stored resource profile for the secured resource, the stored resource profile indicating authentication requirements of the secured resource; accessing attribute data for the particular user, the attribute data describing attributes of the client device and a user account of the particular user; and, providing, by the one or more computers, the second authentication data for the particular user for the second authentication protocol further includes generating an authentication request for the secured resource by selecting attributes from the attribute data based on the stored resource profile; and providing the generated authentication request to the secured resource.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
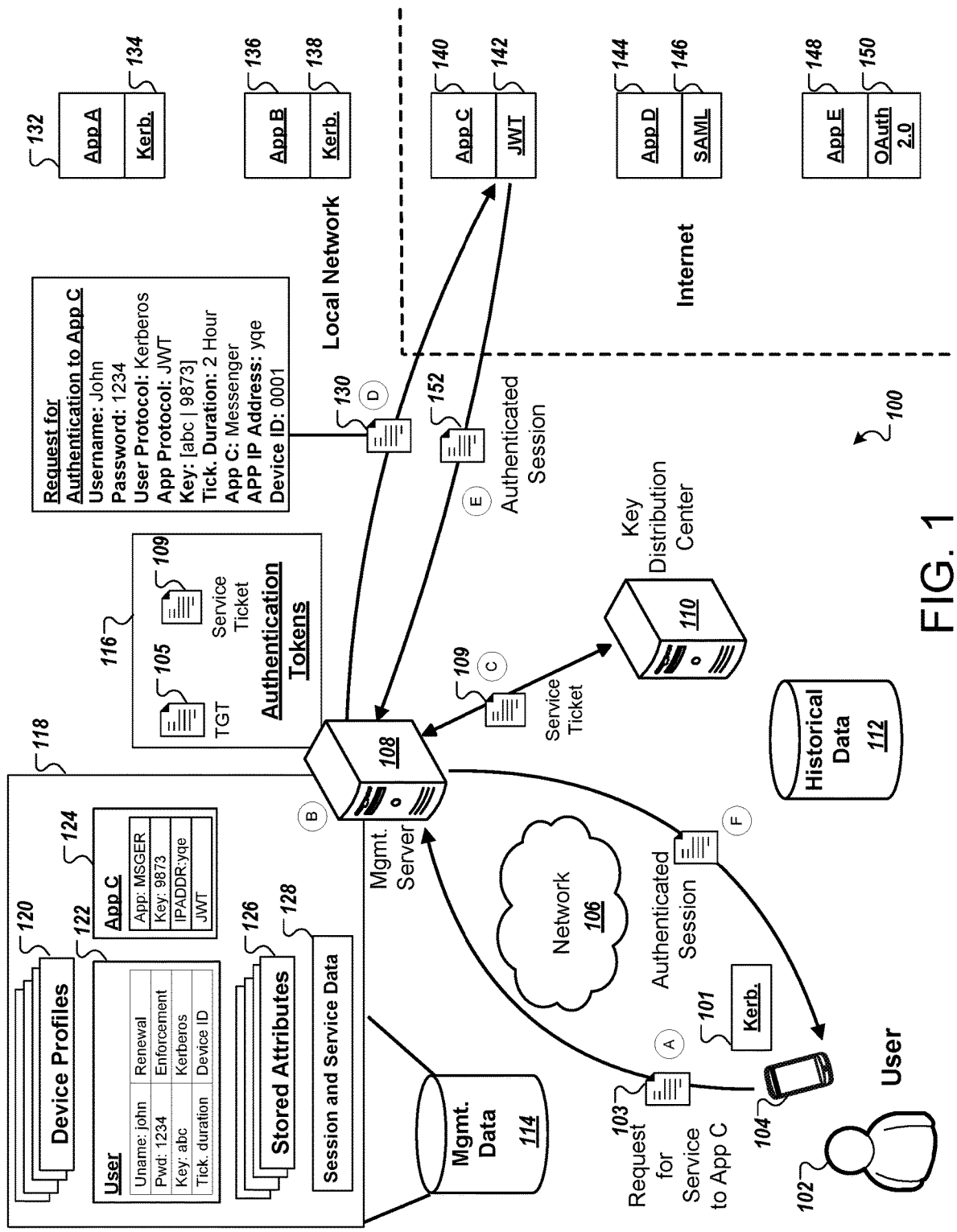
FIG. 1 is a block diagram that illustrates an example of a system for authentication protocol management.

FIG. 1 is a block diagram that illustrates an example of a system 100 for providing a single sign on system across multiple authentication protocols. The system 100 includes a management server 108, a client device 104, a user 102, a network 106, a key distribution center (KDC) 110, historical data database 112, and a management database 114. The management server 108 includes authentication tokens 116 for storing tokens received from the key distribution center 110 for each user. The management database 114 includes device profiles 120 and stored attributes 126. FIG. 1 illustrates various operations in stages (A) to (F) which can be performed in the sequence indicated or in another sequence.

In some implementations, the system 100 provides a single-sign-on (SSO) functionality to a user, such as user 102, requesting for access to one or more resources or sessions. The resources may be files, data sources, databases, applications, web pages, etc., and may be provided within the local network or outside the local network. The SSO functionality allows a user 102 to sign on to the management server 108 using one or more credentials once to begin a session, and then during the session access various services that typically require a separate login. For example, the one or more credentials can include a username, password, biometric scan, a token, a PKI certificate, or a set of personal questions, to name a few examples, to verify the identity of the login user. In response, the management server 108 provides the user 102 with access to the one or more services without the user having to login to each of the one or more services. In typical situations, the user would have to login to each of these services with his or her credentials. This becomes a tedious process for a user each time he or she wishes to access a service. By providing the SSO functionality in system 100, system 100 removes this tiresome burden from the user while maintaining a high integrity of security.

In some implementations, the one or more services may be included in a network local to the management server 108. In addition to the one or more services found in the local network, the system 100 may provide a user access to one or more services found on the Internet or in another third-party network. For example, the services may include a messenger application, a video messaging application, an emailing application, or a file system application, to name a few examples.

Each service includes one or more protocols required for an outsider to communicate with the service. For instance, system 100 illustrates various applications and their corresponding protocols. In particular, Application A 132 and Application B 136 both use Kerberos for protocols 134 and 138. These applications are included in the local network of the management server 108. Additionally, system 100 illustrates various applications found on the Internet. For instance, Application C 140 uses the JSON Web Token (JWT) protocol 142; Application D uses the Security Assertion Markup Language (SAML) protocol 146; and, Application E uses the OAuth 2.0 protocol 150.

In many instances, the management server 108 locates user specific data from the management database 114 when a user requests access to a particular service. Although, locating user specific information among a large set of information can be challenging time consuming and tedious process. In particular, searching for user specific information may require the server to filter large sets of information in the management database 114. The difficulty of filtering large sets of information is compounded when user specific data is stored with different versions or when the user specific data is distributed across multiple locations.

To reduce the amount of time required to access user specific information, the system 100 can predictively determine which service the user will request and generate access to that service before the user transmits such a request. To predictively determine which service the user will request, the system 100 can perform an analysis on previous and current context data corresponding to the user. In particular, the management server 108 can retrieve previous and current context data stored in the historical data database 112. The management server 108 can analyze the previous and current context data to determine trends, frequency patterns, and other statistical measures that provide an indication as to what service the user is likely to pick.

In general, the management server 108 can evaluate many different aspects of context discussed below. When the activity over time reaches a minimum level of volume (e.g., number of accesses) and/or minimum level of consistency for a context, which may include multiple contextual factors, the management server 108 can determine the authentication protocol(s) used in that context and store the data. When the context is detected again, the management server 108 can predictively authenticate the user for the authentication protocol(s) that have been used in that context previously, without the user specifically directing the system to do so. In other words, after a user has made use of certain authentication protocols in a context, the management server 108 can automatically obtain authentication for those authentication protocols when the user is in the same or similar context (e.g., in a context determined to match the previously observed context within a threshold level of similarity).

As an example, the management server 108 may determine that the user of the client device 104 has accessed a particular secured network resource from a particular location (e.g., such as a particular room in an office building) on multiple occasions. Based on the location context and history of accesses, when the management server 108 detects that the client device 104 returns to that context (e.g., the particular location), the management server 108 can automatically authenticate the user and create an authenticated session for the authentication protocol(s) that are needed to access the particular secured network resource. As a result, if the user initiates access to the resource, access can be quick and seamless since an authenticated session is already available.

The management server 108 can retrieve and analyze current context of the client device 104 to predict which service the user 102 will request. For example, the current context can include a location of the client device 104, e.g., indicated by GPS coordinates, a message from a location beacon, or other location information, and a current time. Other aspects of context that the server 108 can obtain and use include, for example, an indication of wireless beacons the client device 104 has detected, the identity of documents or data sources currently open on the client device 104 or those accessed recently (e.g., within a predetermined threshold period of time), data identifying other devices or users within a threshold level of proximity to the client device 104, data identifying applications currently or recently active on the client device 104, data indicating applications installed on the client device 104, and so on. In general, information about any appropriate aspect of the state of the client device can be determined as part of the context, such as location, status of hardware and/or software, operations or tasks in progress, information displayed on the user interface, etc.

The management server 108 can analyze various properties of the client device 104 to determine context. These properties can include processing capability of the client device 104, the memory usage client device 104, a number of or identity of applications stored on the client device 104, the frequency of use of each applications on the client device 104, the types of authentication protocols each application requires for connecting to the management server 108, and a length of time the user 102 uses each of the applications on his/her client device 104.

In general, context is can be determined based on user identity (e.g., based on which user is logged in). If multiple people log in to the client device 104 at different times, the context of the client device 104 can vary based on which user is logged in to the client device 104. For example, different users that log in using different credentials typically have different usage patterns and thus differing contexts of the client device 104. For example, this can include different application usage and different time using each of the applications. Thus, the management server 108 can associate usage histories and other indications of context of the client device 104 with a particular user, such as user 102. Additionally, the management server 108 can store the data indicating usage of the client device 104 corresponding with a particular user in the management database 114 for future analysis.

The context can include other information for predicting which service the user 102 will request, such as data indicating whether other devices are in proximity to the client device 104, and the identities of those devices and their corresponding users. The client device 104 can determine whether other devices are within its proximity using various communication protocols, such as Bluetooth, Wi-Fi, RFID, and ZigBee communications. The management server 108 can instruct the client device 104 to communicate with the other devices within proximity to determine which applications are currently displayed or currently in use on the other devices. The applications currently displayed or currently in use on the other devices may help predict which application the client device 104 will display, and subsequently, which service will be requested by client device 104 at a later point in time.

Additionally, the management server 108 can analyze data indicating connections to services that the client device 104 and user 102 previously requested in the past, and the contexts in which those connections were made. The management server 108 can determine whether the request resulted in a successful or unsuccessful connection to the requested service, the type of requested service, the authentication protocol used to connect to the requested service, private and public keys of the client device 104, private and public keys corresponding to the requested service, the physical characteristics of the client device 104 at the time the user 102 requested the service, and the state of the client device 104 at the time the user was granted access to the service or not granted access to the service. In some implementations, the management server 108 can provide the context data and the historical data of the client device 104 to a neural network or other machine-learning model to predict which service(s) the user 102 may request access to, or what authentication protocols may be needed. This will be further explained below.

Once the management server 108 predicts which service the user will request, the management server 108 retrieves the necessary information from the management database 114 for accessing the predicted service before the user transmits a request for the predicted service. The necessary information can include a user's username, password, key value, any previous tickets, currently pending tickets, and various protocol types corresponding to the user. Additionally, the management server 108 can retrieve data corresponding to the predicted service from the management database 114. The data corresponding to the predicted service can include the service name, a type of the service, a key value, an Internet Protocol (IP) address for the predicted service, and the authentication protocol required to communicate with the predicted service. The management server 108 can retrieve and store the data for accessing the predicted service. At a later point in time, when the user does in fact transmit the request to the management server 108 for the predicted service, the management server 108 can automatically provide the user with an authenticated session for the service to his/her client device. This benefit improves the user experience for connecting the predicted service to the user's client device using a particular authentication protocol before the user transmits the request for the predicted service. This will be further explained below.

In order for the user 102 to access the service (e.g., application) in system 100, the user 102 must identify himself/herself for the first time to the system 100. Initially, for the user 102 to identify himself/herself to system 100, the user 102 can enter one or more credentials into the client device 104. As mentioned above, the one or more credentials may include a username, a password, a PKI certificate, or a biometric scan, to name a few examples. The client device 104 can transmit data indicating a portion of or all of the one or more credentials to the management server 108 to verify the user 102's authenticity. For example, the data may include an encrypted portion of the one or more credentials or a clear text portion of the one or more credentials. The management server 108 receives the newly entered credentials and generates a new account in the management database 114 for the user 102 and his/her corresponding client device 104. In addition, the management server 108 communicates with the key distribution center 110 to generate a key for the user 102. In this regard, the management server 108 stores the one or more credentials and the generated key for the user 102 in the management database 114. As will be further described below, FIG. 1 illustrates the later step of authenticating the user 102, authorizing the user 102 to communicate with the one or more services, and receiving service requests from the user 102 to access the one or more services.

Referring to FIG. 1, in the system 100, the client device 104 can be, for example, a desktop computer, a laptop computer, a tablet computer, a wearable computer, a cellular phone, a phone, a music player, an e-book reader, a navigation system, or any other appropriate computing device. The management server 108 can represent a single computer or multiple computers, which may be distributed across multiple geographic areas. Additionally, the key distribution center 110 can also represent a single computer or multiple computers, which may be distributed across multiple geographic areas. The network 106 can be wired or wireless or a combination of both, and can include the Internet.

FIG. 1 shows an example of a user 102 requesting a service from the system 100 with a client device 104 using a particular protocol 101. The client device 104 transmits an indication of a request 103 to the management server 108. The request 103 can include the particular protocol 101, such as Kerberos, data identifying the client device 104 (e.g., an IP address, a telephone number, a name of the client device 104, and a MAC address, etc.), information corresponding to the user 102 (e.g., name of the user, password of the user, and any previous login attempts by user 102, etc.), and data identifying the requested service (e.g., a request to access application C). The management server 108 receives the request 103 and first verifies the identity of user 102. In response to verifying the identity of user 102, the management server 108 determines whether the user 102's request 103 is authorized by comparing it with authorization data in the management database 114 and ticket data found in the key distribution center 110. If the management server 108 determines the user 102's request 103 is authorized and in response, authenticates the user 102 to access system 100, the management server 108 formulates a request to send to the requested service. In particular, the management server 108 generates the request based on (i) the device profile 120 of the user 102, (ii) one or more stored attributes 126 for the user 102, (iii) the user 102's transmit protocol, (iv) the requested service's communication protocol, (v) a determination as to whether the management server 108 needs to translate the user 102's transmit protocol to the requested services communication protocol, (vi) ticket information, and (vii) any other user specific information. The management server 108 transmits the generated request 130 to the requested service for access. In response, the management server 108 receives an indication as to whether the requested service is granted or denied access to the user 102. The management server 108 provides the indication to the client device 104 of the user 102.

During stage (A), the user 102 logins to an application using client device 104 that accesses the system 100. The user 102 can provide one or more credentials to the client device 104 to login to the application. For example, the user 102 can provide a username, a password, an indication to load a PKI certificate on the client device 104, or perform a biometric scan. After logging in to the application on the client device 104, the user 102 requests access to a service on the application. The requested service may be located on the local network connected to the management server 108. Alternatively, the requested service may be located on the Internet or another third party network. For example, the service may be application A 132, application B 136, application C 140, application D 144, application E 148, or a combination of any of the applications. The types of applications may include a video messaging application, an email application, a virtual network platform, a payroll application, or any other type of client device application, to name some examples. As illustrated in FIG. 1, the user 102 requests the service for application C 140.

The client device 104 formulates the request 103 for the service of application C 140. The client device 104 formulates the one or more credentials input by the user 102, data indicating the requested application C 140, and data indicating an identification of the device 104 into a request 103. In some implementations, the client device 104 may encrypt a part of or the entire request 103 to transmit. In addition, the client device 104 prepares to transmit the request 103 using the protocol 101. As illustrated in FIG. 1, the protocol 101 may be the Kerberos protocol. In other implementations, the protocol 101 may be OAuth 2.0, JSON Web Tokens (JWT), OpenID connect (OIDC), Open Web Application Security Project (OWASP), or Security Assertion Markup Language (SAML), to name a few examples.

In some implementations, the client device 104 may dictate the protocol 101 to transmit the request 103 based on its internal components (e.g., hardware and software components of the client device 104). In other implementations, the management server 108 may dictate the protocol 101 that the client device 104 uses to transmit the request 103. In other implementations, the user 102 may specify the type of protocol 101 for the client device 104 to utilize to transmit the request 103 based one or more factors. The one or more factors may include using a protocol to achieve a desired security level, to meet a network requirement of system 100, or to meet a personal preference of the user 102. In other implementations, the management server 108 may automatically change the protocol 101 based on bandwidth constraints of the network 106.

The protocol management server 108 can employ a multi-protocol service with an adaptive protocol selection. The protocol management server 108 can use any protocol for communicating with a client device. In addition, the protocol management server 108 can receive data over new protocols not currently implemented by the protocol management server 108. If the protocol management server 108 does not currently understand the protocol, the protocol management server 108 can retrieve data from the Internet or transmit a request to a technician to implement the new protocol in the protocol management server 108. The protocols can be managed concurrently, such that, if multiple client devices are communicating with different protocols to the protocol management server 108, the protocol management server 108 can respond to each client device with their own respective protocol. The protocol management server 108 can also concurrently manage the switching of one protocol for the client device to another requested service protocol, and do so for multiple client devices and services.

The client device 104 sends data indicating the request 103 to the management server 108 over the network 106. For example, the client device 104 transmits the username and password of the user 102, data that indicates the user 102 requests application C 140, and data indicating an identification of the device 104, such as its IP address and MAC address, in a formulated request 103. In some implementations, the formulated request 103 may be fully encrypted by a key that is known by both the client device 104 and the protocol management server 108. In some implementations, the key that is known by both the client device 104 and the protocol management server 108 may encrypt a portion of the formulated request 103. For instance, the username of the formulated request 103 may not be encrypted in order for the protocol management server 108 to quickly and efficiently identify the user 102 who transmitted the request 103. If the protocol management server 108 can decrypt the encrypted portion of the request 103, then the protocol management server 108 can confirm with confidence the user 102 who transmitted the request 103.

In some instances, the client device 104 may send additional context data to the management server 108. For example, the client device 104 may send current location information using GPS or another locational service data, movement data indicating movement of the client device 104, data indicating any application that is currently active on the client device 104, and associated timestamp data.

In some implementations, the client device 104 may transmit the additional context data on a periodic basis. The periodic basis may be, for example, hourly, daily, weekly, or monthly. In other implementations, the client device 104 may transmit the additional context data each time the user transmits the request 103 to the management server 108 over the network 106. In other implementations, the protocol management server 108 can request additional context data from the client device 104 on a periodic basis.

During stage (B), the management server 108 interprets the request 103 indicated by the data received from the client device 104. The management server 108 analyzes the request 103 to first verify the identity of the user 102 that transmitted the request 103. In some implementations, authentication is performed by checking the username provided in the transmitted request 103. In some implementations, authentication is performed by verifying the management server 108 can properly analyze the data in the request 103 by successfully processing the request with the protocol transmit by the client device. If the entire transmitted request 103 is encrypted, the management server 108 can try to decrypt the transmitted request 103 with data from each of the device profiles 120 in the management database 114. The data includes one or more keys stored in each of the device profiles 120. If the management server 108 is able to successfully decrypt the transmitted request 103 with a key from one of the device profiles 120, then the username corresponding to the device profile 120 where the key is retrieved will match the username found in the decrypted transmitted request 103. If, however, the management server 108 is not able to successfully decrypt the transmitted request 103, then the management server 108 declines the client device 104's request 103 and transmits a message to the client device 104 indicating that a login attempt failed.

In other implementations, if only a portion of the transmitted request 103 is encrypted, then the management server 108 can try to decrypt the encrypted portion of the transmitted request 103. Typically, the decrypted portion of the transmitted request 103 includes an identifier of the transmitting client device 104. For instance, the identifier may be the username, a device ID, or a name of the user 102. The management server 108 uses the identifier as an index to retrieve a key from the device profiles 120. For instance, the identifier found in the transmitted request 103 may include the name "john." The management server 108 can retrieve the profile from the device profiles 120 that includes the username of "john." As illustrated in FIG. 1, the protocol management server 108 retrieves the user profile 122 from the device profiles 120 because it includes the username "john." The management server 108 retrieves the key "abc" from the user profile 122 and uses the key to decrypt the encrypted portion of the transmitted request 103. If the management server 108 is able to successfully decrypt the remaining portion of the transmitted request 103 using the retrieved key, then the management server 108 is able to verify the identity of the user who transmitted the request 103.

In some implementations, the user profile 122 illustrates known data for the user "john." For instance, the data includes the username, the password, a key, a ticket duration length, a renewal policy, an enforcement of the renewal policy, a protocol type, and a device ID. The management server 108 tracks this data for each subsequent login to the system 100 by the user "john." The management server 108 also tracks this data for logins by other users of the system 100. In some implementations, the management server 108 may receive an update from the client device 104 corresponding to the user "john," that indicates a change to the data of the user profile 122. Additionally, the management server 108 may receive an update from the key distribution center 110 that indicates a change to the data of the user profile 122 for "john." For example, the key distribution center 110 can provide a change to the key value for the user profile 122. In another example, the key distribution center 110 can provide a change to the ticket duration value for the user profile 122.

In some implementations, the device profiles 120 also stores data for each application that the management server 108 can access. As shown in FIG. 1, application C profile 124 includes data indicating a description of application C 124. For example, the data includes an application type, a key for accessing the application C 140, an IP address for accessing the application C 140, and the protocol type used by the application C 140. User profile 122 and application C profile 124 illustrate two exemplary profiles stored by the device profiles 120 in the management database 114. Other profiles may include profiles for other users that access the system 100 and other application profiles, such as a profile for each of application A 132, application B 136, application C 140, application D 144, and application E 148. The management server 108 can also add a profile for an application that is not found in the device profiles 120. If the transmitted request 103 from client device 104 requests for access to an application that is not found in the device profiles 120, the management server 108 can search on the Internet for access to the requested application and store data corresponding to the requested application in the device profiles 120.

In some instances, the management server 108 may determine that a particular user profile, such as user profile 122, does not have a key. Alternatively, the management server 108 may determine that the particular user profile is in need of a new key because its current key has expired. As a result, the management server 108 may communicate with each user that corresponds to a user profile found in the device profiles 120 to request for a new key. For example, the management server 108 may transmit a request for the key to each of the users. In response, the management server 108 will receive the requested key from each of the users. The management server 108 can determine if the stored key in each of the device profiles 120 needs to be updated to the new received key for each respective user. Additionally, the device profiles 120 store the keys for each application the management server 108 can access on the local network. The management server 108 can also retrieve any key utilized by any application located on the Internet, which is external to the local network. Additionally, the management server 108 can communicate with the key distribution center 110 to retrieve a new key for each client device. The management server 108 can also generate a new profile in the device profiles 120 for an application located on the Internet if the profile does not already exist. In particular, this new profile may include a description of the application type, its IP address to access the application, a key if the application requires a key, a protocol type, and one or more credentials to access the application. The management server 108 can register a new profile with the key distribution center 110 for a new key associated with a newly added application to the device profiles 120. When the new profile is created, the key distribution center 110 can generate the new key for the newly added application so the management server 108 can communicate with the newly added application. The management server 108 can store the new key generated by the key distribution center 110 and information pertaining to the newly added application in the management database 114.

During stage (C), the management server 108 determines if any ticket-granting ticket (TGT) exists for the client device 104 located in the authentication tokens 116 area in the management server 108's memory. After the management server 108 successfully decrypts and verifies the identity of the user 102 from the transmitted request 103, the management server 108 verifies if the client device 104 has permission to access the management server 108 and the KDC 110. In general, each client device needs a TGT that indicates that the respective client device has the approval to communicate with the management server 108 and the KDC 110. For example, client device 104 needs a TGT, such as TGT 105, stored in the authentication tokens 116 area of the management server 108 in order for the client device 104 to communicate with the management server 108 and the KDC 110. If the management server 108 determines that a TGT does not exist for client device 104, then the management server 108 transmits a request to the KDC 110 on behalf of the client device 104 for a new TGT.

In some implementations, the management server 108 determines if any TGTs exists for each of the client devices stored in the authentication tokens 116 before receiving a request from any of the client devices. If no TGTs exist, the management server 108 can pre-authorize and negotiate the TGTs for one or more services corresponding to one or more users with the key distribution center 110. In some implementations, the management server 108 can obtain TGTs for each of the client devices found in the device profiles 120 by communicating with the key distribution center 110. The management server 108 can obtain TGTs for client devices found in the authentication tokens 116 during an offline mode, when the protocol management server 108 is not accepting requests from one or more client devices. The protocol management server 108 can also obtain TGTs for client devices during an online mode for client devices.

In some implementations, the management server 108 can include a neural network to predict a service that a user will request for before receiving the request. The neural network model may include an input layer, an output layer, and one or more hidden layers. The management server 108 can use a machine learning technique to train the neural network as the system 100 receives requests from users for selecting services when the management server 108 applies the model.

The management server 108 can train the neural network model using data for each particular user from the management database 114. For example, the data can include data identifying the user, such as a username, client device information corresponding to each user, a service found in a request for a user, a time of day and a day that the request was sent, GPS information corresponding to the user's client device when the request was sent, movement data for each user's client device, frequently used protocol types for the user, frequently used protocol types for the one or more client devices of the user, protocol types for each requested service, and data corresponding to the translation of the client device protocol to the requested service protocol. This data can include the context data for each user and corresponding client device 104. The management server 108 can apply this data to train the neural network model each time a new request is received from a client device. In addition, the management server 108 can apply this data to train the neural network model during an offline mode when the management server 108 is not receiving requests from client devices.

When the management server 108 applies the trained neural network model, the management server 108 can apply data from the management database 114 for a particular user to determine one or more services that a user may request. In one example, the management server 108 retrieves, for a particular user "john", a username, data identifying a client device, a current date, time of day, and previous requests made by the user on the time of day to the trained neural network model. The trained neural network model can output an indication of one or more services that that particular user may potentially request from the management server 108. Continuing with the example, the management server 108 provides the data from the management database 114 for the user "john" to the trained neural network model. The trained neural network model can output a likelihood that the user is to request one or more services from the management server 108. The likelihood can be a probability or a ranking of selections for each of the services App A through App E. Additionally, the trained neural network model can output an indication that the user is likely to not request for any services today.

Additionally, while applying the trained neural network model, the protocol management server 108 can apply data to fine tune the trained neural network model. The protocol management server 108 can fine-tune the trained neural network model when its predictions for requested services does not match the requested services provided by the client device. The protocol management server 108 can provide data corresponding the received request to the trained neural network model for fine-tuning. Additionally, the protocol management server 108 can provide labels of correct data and incorrect data to the trained neural network model for fine-tune training. For example, the protocol management server 108 can label the received request from the client device as the correct data and provide to the trained neural network model. Similarly, the protocol management server 108 can label the predicted indication as incorrect data, with an indication of the what the correct service prediction should have been, such as Application A, for example, and provide this data to the trained neural network model for fine-tuning.

In some implementations, if the management server 108 receives an indication from the trained neural network model that a likelihood exists that the user will request for one or more services, the management server 108 checks the authentication tokens 116 to determine whether a TGT 105 exists for that particular client device. If the TGT 105 does not exist, then the management server 108 can communicate with the key distribution center 110 to retrieve a TGT for that particular client device. The management server 108 can also perform the steps of determining a likelihood of receiving a request for a service for each user found in the device profiles 120. For any of the users who receive a likelihood for a particular service that is above a particular threshold, the management server 108 can check for a corresponding TGT in the authentication tokens 116 and retrieve one from the key distribution center 110 if a TGT does not exist. That way, if a user sends a request for a particular service that is predicted by the trained neural network model, the management server 108 can use the pre-authorized TGT from the key distribution center 110 to speed up the process in providing the user with access to the requested service. By pre-authorizing the TGTs before the management server 108 receives requests, e.g., negotiating authenticated sessions with the KDC 110 and storing tokens/tickets for the authenticated sessions even before the user requests access to a service, the delay is reduced once the user does request access to the service. In some implementations, this technique of proactively signing in a user for different authentication protocols and/or different resources can significantly reduce the latency in providing access in response to user requests. In addition, in some implementations, information about previous patterns of user requests can be used to selectively determine which authentication protocols and/or resources should have authentication performed predictively in advance. For example, a protocol may be required to have at least a minimum number of accesses, or a minimum frequency of access, for a given user or across a group of users before the management server 108 will predictively initiate or maintain authentication for a user. In some implementations, the protocol management server 108 can also request for a Ticket-Granting Server (TGS) for each service that the trained neural network predicts in order to speed up the process when the client device request for each of the predicted services.

The KDC 110 provides two different services for requesting client devices: (i) an Authentication Service (AS) and (ii) a TGS. The AS issues TGTs for connection to the TGS in the KDC 110. In order for a client device 104 to request a service in the Local Network or on the Internet of the management server 108, the client device 104 must have a TGT stored in the management server 108. The TGT authenticates and authorizes the client device 104 to connect to the management server 108 and the KDC 110. The TGS issues a service ticket for each service the client device 104 is requesting. In particular, when the client device 104 wants to access a service, such as application C 140, the management server 108 contacts the TGS from the KDC 110 and presents the TGT on behalf of the client device 104 to the TGS to prove the client device 104's authentication with the management server 108. The TGS can issue a service ticket to the management server 108 on behalf of the client device 104 that allows the management server 108 to access the requested service or application for the client device 104. The management server 108 stores each TGT and service ticket for each respective client device in its authentication tokens 116.

The management server 108 will receive a TGT for the client device 104 from the KDC 110 to store in the authentication tokens 116. The TGT includes a session key indicated by the KDC 110, an expiration date, and the client device 104's IP address. The client device 104 is then granted access to the network services provided by the protocol management server 108 and the KDC 110 after the management server 108 has this TGT stored in memory (e.g., the authentication tokens 116).

During stage (D), the management server 108 determines the requested service from the decrypted request 103. In particular and as illustrated in FIG. 1, the management server 108 determines the client device 104 requests to have access to application C 140. The management server 108 checks if the requested service (e.g., application C 140) is found in the device profiles 120. In some implementations, the management server 108 may determine the requested service is not found in the device profiles 120. If this is the case, the requested service is not found in the Local Network or has not been accessed on the Internet before. As such, the management server 108 can perform a search on the Internet or another third-party network to see if the requested service can be found. If the management server 108 cannot find the requested service, the management server 108 transmits an error message back to the client device 104 indicating that the requested service does not exist. As shown in FIG. 1, the requested service is found in the device profiles 120 as application C profile 124.

In some implementations, the management server 108 determines if the protocol corresponding to requested application matches the protocol utilized by the client device 104 during the transmission of the request 103. In particular, the management server 108 compares the protocol used by client device 104 as stored in the user profile 122 to the protocol used by application C 140 as stored in the application C profile 124. For example, user profile 122 indicates that client device 104 transmitted the request 103 using the "Kerberos" protocol. In addition, application C profile 124 indicates to the protocol management server 108 that application C 140 communicates using the "JWT" protocol. In response to determining that the protocol sent by the client device 104 is different from the protocol required to communicate with the application C 140, the protocol management server 108 is now required to generate a new request 130 as indicated by the protocol 142 of "JWT" utilized by application C 140. In particular, the protocol management server 108 gathers and formats the request 103 from the client device 104, information from the user profile 122, the service ticket 109, and the application C profile 124 to generate the new request 130. The protocol management server 108 generates the new request 130 to transmit to the application C 140 using the protocol of the application C 140. In general, this process occurs for each transmitted request from a client device when the application protocol differs from the protocol utilized by the client device.

In other implementations, if the client device's protocol matches the requested application protocol, then the protocol management server 108 only need to attach a service ticket to a client device's request before transmitting both to the requested application or service. For example, if client device 104 transmits a request for application A 132, the management server 108 would recognize the client device 104's protocol 101 of Kerberos matches the protocol 134 of Kerberos used by the application A 132. The protocol management server 108 would attach a service ticket, such as service ticket 109, to the request for application A 132 from the client device 104, and transmit both to the application A 132.

In some implementations, the protocol management server 108 can employ a policy that requires one or more additional authentications, beyond the protocol indicated by the client device or the requested protocol service, for improved security. The multiple authentication requirement can require authentication under another protocol that requires one or more security features, such as SAML, OAUTH, or OPENID. Even though the requested service does not require the additional protocol's authentication procedures to be followed, the management server 108 can employ the additional protocol to enforce different or more demanding requirements than otherwise required by the client device and by the requested service.

Additionally, the management server 108 can administer different security policies in addition to the policies required by the client device's protocol and the requested service's protocol. The management server 108 can implement one or more forms of biometric authentication for the client device in response to receiving the request from the client device. The biometric authentication can include a voice identification, a touch identification, and/or a facial scan identification to name a few examples. In some implementations, the management server 108 can store the security policies in the management database 114 for each client device in the device profiles 120. In response to the management server 108 identifying the user from the request, the management server 108 can retrieve the security policies from the management database 114 to determine whether to enforce the security policies. In addition, the requested service may require one or more additional security policies before the requested service provides the user with access to the requested service. The requested service can indicate to the management server 108 to ensure the user meets the additional security policies. Once the management server 108 ensures the user has met the additional security policies, the management server 108 can transmit an indication along with the new request to the requested service to request for user access to the service.

As illustrated in FIG. 1, the protocol management server 108 generates the new request 130 using data from the user profile 122, the application C profile 124, the TGT 105, the service ticket 109, and session and service data 128. The session and service data 128 includes session data provided by the KDC 110, and necessary login data required for the requested application. The new request 130 includes the following features: the username input by the user 102, the password input by the user 102, the protocol utilized by the requested application, the key created for the client device 104, the key utilized by the requested application, the TGT, the service ticket, the ticket duration for the TGT, the ticket duration for the service ticket, the IP address of the requested application, and an identifier of the client device 104. In some implementations, the protocol management server 108 may encrypt a portion of the new request 130 using the key found in the application C profile 124. In other implementations, the protocol management server 108 may encrypt the entirety of the new request 130 using the key found in the application C profile 124. Once the protocol management server 108 formulates the new encrypted request 130, the protocol management server 108 transmits the new encrypted request 130 to the application C 140 using the designated protocol for the application.

In some implementations, the management server 108 stores data in the management database 114 relating to generating a new request when the management server 108 determines the client device's protocol is different from the requested service protocol. The data can include a type of the request provided, the service found in the request, the protocol used by the client device, username and password information found in the request, information pertaining to the service such as the application type, an address of the service, a protocol of the service, and key value of the user and service. Additionally, the management server 108 can store a number of times the switch from one protocol to another protocol has occurred for a particular user. This number can be used by the management server 108 to predict a type of protocol switch necessary for future requests sent by the particular user. The management server 108 may access other files in the management database 114 not related to the user, but related to the switch between a protocol of the client device and the requested service protocol. The management server 108 can use data from the retrieved files to determine how to generate the new request. In particular, the management server 108 may analyze the files to retrieve a data structure format for the new request, security keys required for the requested service protocol, whether multi-factor authentication is required for the requested service protocol, and if any other custom policies exist for communicating using the requested service protocol.

The application C 140 receives the new request 130 from the protocol management server 108. If the protocol management server 108 properly formulated the new request 130 and transmitted the new request 130 using the correct protocol, then application C 140 can properly accept the new request 130. In some implementations, the application C 140 decrypts the new request 130 with a key known to the application C 140. The key known to the application C 140 is the same key found in the application C profile 124 (e.g., key 9873). If the protocol management server 108 properly encrypted the new request 130, then the application C can properly decrypt the new request 130 with the known key. If the protocol management server 108 did not transmit the new request 130 to the application C 140 using the correct protocol, the application C 140 will drop the new request 130 upon receipt. In response, the protocol management server 108 can try to resend the new request 130 with a different protocol or transmit a response to the client device 104 indicating accessing the requested service failed.

In some implementations, the application C 140 authenticates the user 102 to access the application C 140. In particular, the application C 140 decrypts the service ticket using the key of the application. If the application C 140 can properly decrypt the service ticket, then the application C 140 will analyze the remainder of the data found in the decrypted new request 130. The application C 140 uses the service ticket found in the decrypted new request 130 to verify the identity of the user 102. If the application C 140 is able to properly decrypt the service ticket, then the application C 140 is able to allow the user 102 access to the application C 140.

During stage (E), the application C 140 transmits authenticated session data 152 indicating an authenticated session for the client device 104 to the protocol management server 108. The authenticated session data 152 can include a session key for the client device 104, an IP address of the application C 140, and the service ticket 109. The protocol management server 108 stores an indication that the application C 140 provided access to the client device 104. The indication includes a timestamp when the application C 140 approved of the access, a ticket duration for the service ticket, a device ID of the client device 104, IP address of the application C 140, and protocol 142 that utilized to communicate with the application 140 C.

During stage (F), the protocol management server 108 provides the authenticated session data 152 to the client device 104. The authenticated session data 152 provides the client device 104 with access to the application C 140. The client device 104 can now access any feature of the application C 140 over network 106. In some implementations, the client device 104 accesses the application C 140 using the authenticated session data 152 over the management server 108. In other implementations, the client device 104 directly accesses the application C 140 using the authenticated session data 152 alone.

In some implementations, the protocol management server 108 can manage multi-protocol and multi-device sessions for a single user. The protocol management server 108 can manage communications with a device A, such as a desktop computer, and a device B, such as a mobile device, for the same user (e.g., using the same user account, user identity, and/or user credential). Additionally, the protocol management server 108 can manage communications with these two devices, which both may use different protocols. For example, device A communicates with the openID protocol and device B communicates with the SAML protocol. The protocol management server 108 can link both sessions from device A and device B to the same session. Such that, the protocol management server 108 can request from the key distribution center 110 a single TGT for both device A and device B and a TGS for each service for device A and device B. Additionally, any service requested for by device B of the protocol management server 108, device A will also receive access to that service, and vice versa. The number of devices that the protocol management server 108 can link together can be more or less than two. Additionally, when one of the devices closes its connection to the connected service or the protocol management server 108, the protocol management server 108 closes the connection for the remaining devices linked under the same session. The protocol management server 108 also removes one or more tokens from the authentication tokens 116 corresponding to the closed session.

In some implementations, the protocol management server 108 can link different authenticated sessions involving different authentication protocols. This can involve automatically authenticating a session when a related session becomes authenticated, or automatically closing a session when a related session is closed. In some cases, a single joint session may be created that requires authentication using two different protocols. In particular, the session can involve a first communication protocol between the client device and the protocol management server 108 as well as a second communication protocol between the protocol management server 108 and the requested application. The protocol management server 108 can determine if either the first communication protocol or the second communication protocol loses authentication, through expiration, revocation, or other means. If the protocol management server 108 determines the authorization for the first communication protocol has ended, then the protocol management server 108 can end the session for the second communication protocol, and vice versa (e.g., if the management server 108 detects an end in the authorization for second communication protocol, then the protocol management server 108 ends the first communication protocol).

The operations of stages (A) to (F) illustrate a single example of providing a single sign on system across multiple protocols for the client device 104. The management server 108 can repeat the operations of stages (A) to (F) as the context of the client device 104 changes to request new services in system 100. Similarly, the server can perform the operations of stages (A) to (F) to provide a single sign on system for other users. As a result, the management server 108 can concurrently provide single sign on systems for devices of various users.

Figure 2:
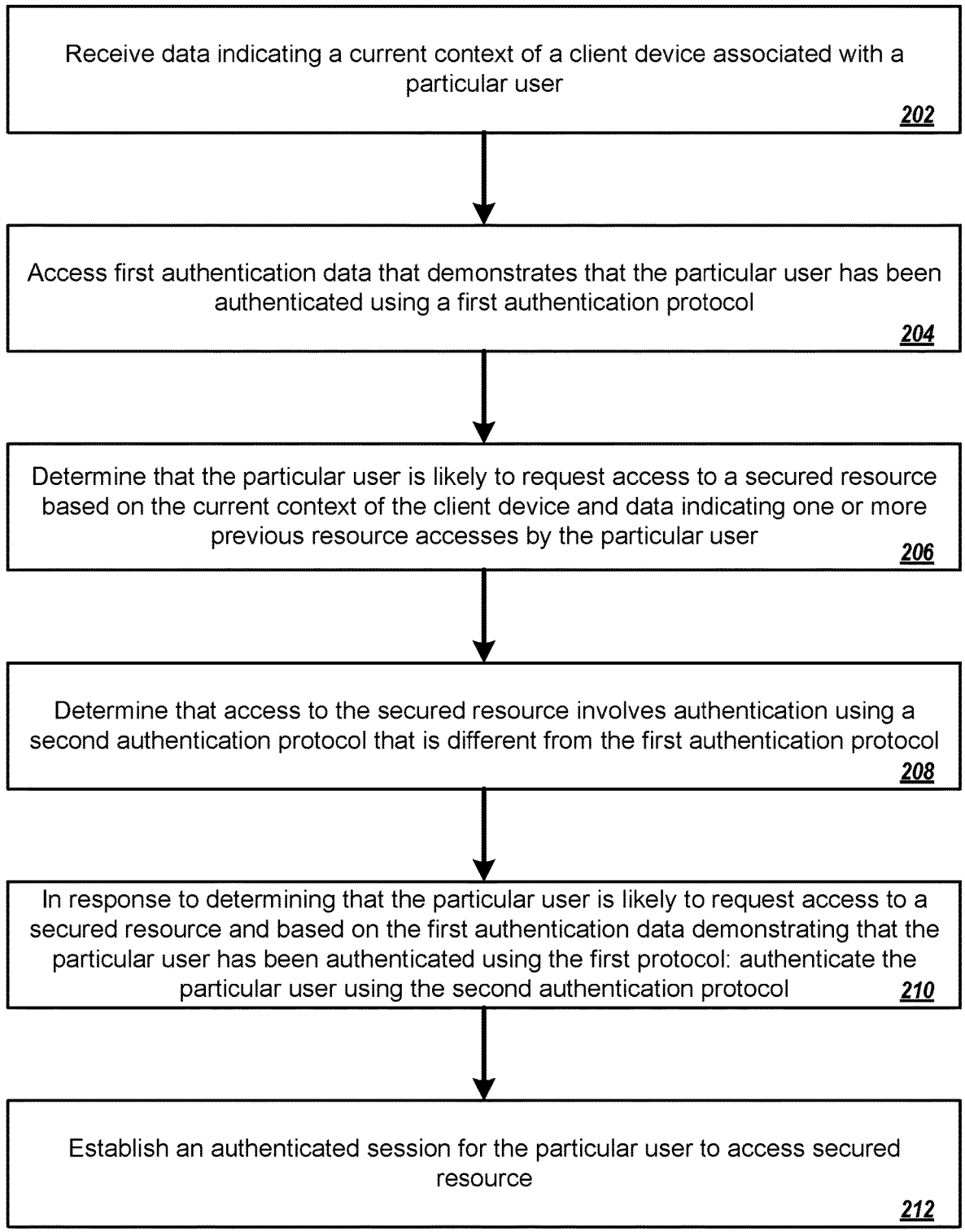
FIG. 2 is a flow diagram of an example process for providing a transparent protocol translation process.

FIG. 2 is a flow diagram of an example process 200 for providing a transparent protocol translation process. The process 200 can be performed by one or more computers. The process 200 is described below as being performed by the protocol management server 108 of FIG. 1, but can be performed by any appropriate computing device or combination of computer devices.

The protocol management server receives data indicating a current context of a client device associated with a particular user (202). The protocol management server may seek to predictively determine which service the user will request and generate access to that service before the user transmits such a request. The protocol management server can analyze previous and current context data corresponding to the user/client device to predict a service the user may request. The current context data can include locational data of the client device, time data, and physical characteristic data of the client device. The physical characteristic data of the client device can include the client device's processing power, the memory usage/management, number of applications, the frequency of use of each application, the type of authentication protocols used for the various application, and a length of time the user uses each application. The physical characteristic data of the client device can also include other data pertaining to the client device, such as other physical devices within proximity to client device and their corresponding applications displayed and frequently used. The types of application the user may request include a video messaging application, an email application, a virtual network platform, a payroll application, or any other type of client device application, to name some examples. The client device or the protocol management server can dictate the protocol. The protocol management server can additionally retrieve one or more credentials input by the user corresponding to the client device, data indicating the requested service, and data indicating an identification of the client device that transmitted the request to predictively determine which service the user will request for at a later point in time.

The protocol management server accesses first authentication data that demonstrates that the particular user has been authenticated using a first authentication protocol (204). In some implementations, the protocol management server determines the first authentication data from the management database that indicates the protocol utilized to connect the client device to the protocol management server. The protocol management server can use an identifier of a client device, such as a name or user ID, to retrieve one or more keys from the device profiles in the management data database. The one or more keys can be used to determine whether any TGTs exist for the client device. The TGT indicates that the client devices has been approved or authenticated to communicate with the management server and the key distribution center (KDC). If no TGTs exist, the protocol management server can pre-authorize and negotiate the TGTs for one or more services corresponding to one or more users with the KDC. The management server can receive a TGT for the client device from the KDC to store in the authentication tokens. The TGT includes a session key indicated by the KDC, an expiration date, and the client device's IP address. Thus, the particular user now has the first authentication data to communicate with the protocol management server and the KDC.

The protocol management server determines that particular user is likely to request access to a secured resource based on the current context of the client device and data indicating one or more previous resource accesses by the particular user (206). In some implementations, the protocol management server can provide the current context of the client device and the data indicating one or more previous resource accesses by the particular user to a neural network to predict a service that a user will request for before receiving the request. The protocol management server can use a machine learning technique to train the neural network to accurately predict which service the user will request for before receiving the request. The protocol management server can retrieve data corresponding to previous requests made by the user, data corresponding to the previous requests made by the user, and current context data of the user's client device to provide to a trained neural network model. The data corresponding to the previous requests made by the user can include whether the request resulted in a successful or unsuccessful connection to the requested service, the type of requested service, the authentication protocol used to connect to the requested service, private and public keys of the client device, private and public keys corresponding to the requested service, the physical characteristics of the client device at the time the user requested the service, and the physical characteristics of the client device at the time the user was granted access to the service or not granted access to the service. Other data can be used to predict by the trained neural network model which service the user will request before the protocol management server receives the request. Once the trained neural network model outputs a prediction indicating which service the user will request, the management server retrieves the necessary information from the management database to complete the connection based on the predicted request.

The protocol management server determines that access to the secured resource involves authentication using a second authentication protocol that is different from the first authentication protocol (208). The protocol management server checks the device profiles in the management data database to determine if access exists to the secured resource that the trained neural network model predicted that the user would request before the protocol management server received the request. In addition, the protocol management server can determine the protocol required to communicate with the secured resource. If the requested secured resource is not found in the device profiles, the protocol management server can perform a search on the Internet or another third-party network to see if the requested service can be found. If the protocol management server cannot find the requested service, then the protocol management server can transmit an error message to the client device indicating that the requested service does not exist.

The protocol management server can check the protocol required to communicate with the predicted secured resource from the device profile. For example, the protocol can include JWT, SAML, OAUTH, or Kerberos. The protocol management server compares the protocol used by the client device as stored in one of the user profiles found in the device profiles to the protocol used by the requested service. For example, a user profile can indicate that the client device transmitted the request using the "Kerberos" protocol. Additionally, the protocol management server determines that the protocol required to communicate with the requested application is SAML. Thus, the protocol used by the client device is not supported by the requested application's protocol.

In response to the protocol management server determining that the particular user is likely to request access to a secured resource and based on the first authentication data demonstrating that the particular user has been authenticated using the first protocol, the protocol management server authenticates the particular user using the second authentication protocol (210). In some implementations, the protocol management server can predict that the user plans to request for predicted service and determine that that predicted service requires a different protocol than the protocol used by the client device to communicate with the protocol management server. In response to the protocol management server determining the difference between these two protocol types, the protocol management server generates second authentication data for the particular user corresponding to the client device for authenticating the user. The second authentication data is formatted using data corresponding to the client device, information from the user profile corresponding to the user, TGT ticket data, the service ticket (TGS ticket), and data corresponding to the requested application. The second authentication data can be fully encrypted or partially encrypted. For example, the second authentication data can include biometric information of the user, a username input by the user in the client device, a user account identifier, the password input by the user, a device identifier for the client device, a personal identification number, the protocol utilized by the requested application, the key created for the client device by the KDC, the key utilized by the requested application from the KDC, the destination address of the requested application, and an identifier of the client device.

The protocol management server establishes an authenticated session for the particular user to access the secured resource (212). Once the protocol management server generates the second authentication data, the protocol management server transmits the second authentication data to the requested application to request for establishing user access to the requested application. In addition, the requested service may require one or more additional security policies before the requested service provides the user with access to the requested service. The requested service can indicate to the management server to ensure the user meets the additional security policies. Once the management server ensures the user has met the additional security policies, the management server can transmit an indication along with the new request to the requested service to request for user access to the service. The additional security policies can include a voice identification, a biometric identification, a retina scan, or a PIN number, are examples of additional security policies.

If the protocol management server properly formulated the second authentication data correctly with the proper protocol, the protocol management server will receive session data from the requested application that authenticates the users' access to the requested application. The session data can include a session key to provide to the client device, an IP address of the requested application for the client device to communicate with, and a service ticket. The protocol management server stores an indication that the requested application provided access to the client device. The indication can include a session duration of the service ticket, session data that includes a timestamp when the application provided the client device access, an application corresponding to the session data, device ID of the client device, an address (IP address or URL link) of the application, a protocol utilized to communicate with the requested application, and a protocol utilized by the client device.

In response to the client device requesting access to the predicted service, the protocol management server provides the stored session data to the client device that describes an authentication session enabling the client device to access the secured resource. In some implementations, the protocol management server can receive a request from a user to access the particular resource and retrieve the session data for a particular client device. In other implementations, the protocol management server can retrieve the session data for a particular client device before the client device sends a request for a particular service. As previously mentioned, the protocol management server can use a local or external neural network to predict a service the user will request for at a later point in time. The protocol management server can store the session data for the requested service in the management data database until the client device requests for the requested service. Additionally, the protocol management server can store the TGT and the TGS in the authentication tokens for the client device and the particular service until the request is received. Once the protocol management server receives the request from the client device, the protocol management server transmits the session data stored in the management data database.

In response to receiving the request from the client device for the predicted service, the protocol management server transmits the session data from the requested application to the client device over the network. In some implementations, the protocol management server transmits the session data to the client device using the first protocol. In other implementations, the protocol management server transmits the session data to the client device using another form of communication protocol. For example, the protocol management server can transmit the session data using TCP/IP or UDP. The session data provides the client device with access to the requested service. The session data can include a link or access to the virtual network to communicate with the requested service.

Once the session data has ended, the protocol management server closes the session of the client device. If any other client devices are linked to the client device, the protocol management server closes the session of the other client devices as well. If the protocol management server terminates the session before the session data ends, then the protocol management server removes the session between the protocol management server 108 and the requested application. Additionally, the protocol management server removes the TGT and the TGS corresponding to the closed session of the client device from the authentication tokens and stores a corresponding timestamp in the management data database indicating when the session was terminated.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

Figure 3:
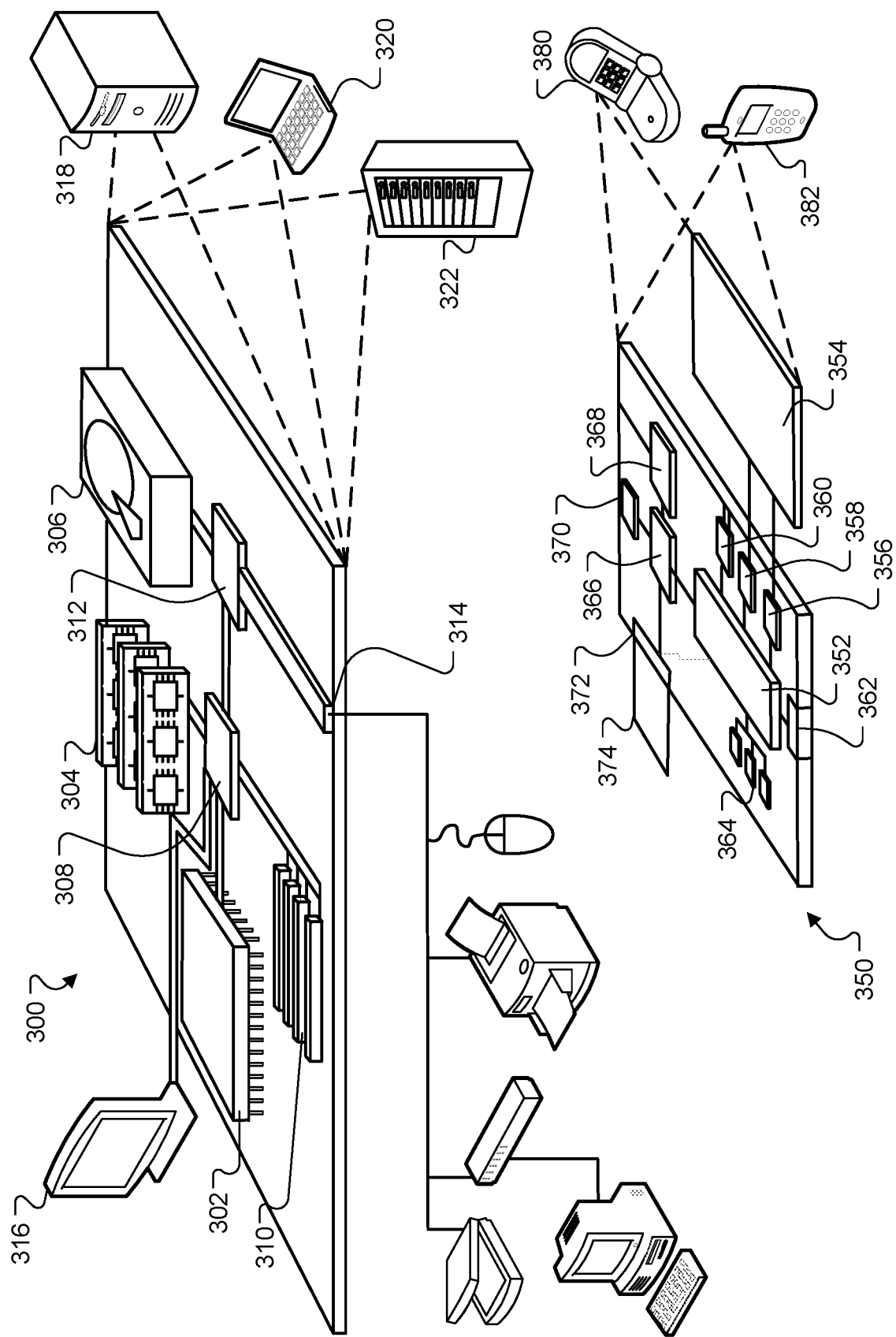
FIG. 3 shows an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 318, or multiple times in a group of such servers. In addition, it may be implemented in a personal computer such as a laptop computer 320. It may also be implemented as part of a rack server system 322. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving, by the one or more computers, data indicating a current context of a client device associated with a particular user;

accessing, by the one or more computers, first authentication data that demonstrates that the particular user has been authenticated using a first authentication protocol;

determining, by the one or more computers, that the particular user is likely to request access to a secured resource based on the current context of the client device and data indicating one or more previous resource accesses by the particular user;

accessing a stored resource profile for the secured resource, the stored resource profile indicating authentication requirements of the secured resource;

determining, by the one or more computers, that access to the secured resource involves authentication using a second authentication protocol that is different from the first authentication protocol;

accessing, by the one or more computers, attribute data for the particular user, the attribute data describing attributes of at least one of the client device or a user account of the particular user;

in response to determining that the particular user is likely to request access to the secured resource and based on the first authentication data demonstrating that the particular user has been authenticated using the first authentication protocol:

generating, by the one or more computers, an authentication request for the particular user to access the secured resource, the authentication request being generated using attributes selected from the attribute data based on the stored resource profile;

using, by the one or more computers, the generated authentication request to authenticate the particular user using the second authentication protocol; and establishing, by the one or more computers, an authenticated session for the particular user to access the secured resource.

2. The method of claim 1, further comprising:
providing, by the one or more computers, session data to the client device that enables the client device to access the secured resource using the authenticated session.

3. The method of claim 1, wherein accessing the first authentication data comprises receiving a Kerberos ticket for an authenticated Kerberos session of the particular user in a local area network domain; and wherein the secured resource is a resource outside the local area network domain.

4. The method of claim 1, wherein determining that access to the secured resource involves authentication using a second authentication protocol comprises determining that access to the secured resource comprises authentication using at least one of Open Authentication protocol, Security Assertion Markup Language (SAML), OpenID connect (OIDC), JSON Web Tokens (JWT), or Open Web Application Security Project (OWASP).

5. The method of claim 1, wherein the secured resource comprises a data source, a document, a web page, a network-based application, a network-based service, or a remote computer system.

6. The method of claim 1, wherein the first authentication data comprises a Kerberos ticket, from a Kerberos key distribution center, that is currently valid, the Kerberos ticket being stored by the one or more computers on behalf of the client device; and wherein the authentication is established by the one or more computers using second authentication data for the particular user that comprises at least one of biometric data, a user name, a user account identifier, a device identifier for the client device, a password, a personal identification number, a code, or a data token.

7. The method of claim 1, wherein determining that access to the secured resource involves authentication using a second authentication protocol comprises:

determining that the secured resource is outside a domain of the client device, the one or more computers, or a key distribution center for the first authentication protocol; and determining, based on the stored resource profile for the secured resource or communication with the secured resource, that the first authentication protocol is not supported by the secured resource but the second authentication protocol is supported by the secured resource, or determining, based on a management profile, that a management policy directs use of the second authentication protocol in addition to requirements of the secured resource.

8. The method of claim 1, comprising:
before receiving the request from the client device to access the secured resource:

establishing the authenticated session for the particular user with the secured resource; and storing session data describing the authenticated session for the particular user to access the secured resource; and providing the stored session data to the client device in response to receiving a request from the client device to access the secured resource.

9. The method of claim 1, further comprising:
communicating with multiple different services to establish authenticated sessions for the particular user for each of the multiple different services without user action to initiate access to the multiple different services, the multiple different services using different authentication protocols; and storing authentication tokens for the authentication sessions and maintaining the authentication sessions active while a Kerberos authentication for the particular user in a local area network domain remains active.

10. The method of claim 1, further comprising:
determining that authentication of the particular user for the first authentication protocol or the second authentication protocol expires within a threshold amount of time; and based on determining that authentication of the particular user for the first authentication protocol or the second authentication protocol expires within the threshold amount of time, automatically renewing the authentication of the particular user for the first authentication protocol or the second authentication protocol.

11. The method claim 1, further comprising:
determining that the authenticated session of the particular user for the first authentication protocol has ended; and based on determining that the authenticated session of the particular user for the first authentication protocol has ended, ending the authenticated session of the particular user for the secured resource that was obtained using the second authentication protocol.

12. The method of claim 1, further comprising:
after establishing the authenticated session for the particular user to access the secured resource, receiving, by the one or more computers, a request from the client device to access the secured resource; and in response to receiving the request from the client device to access the secured resource, providing, by the one or more computers, second authentication data that enables the client device to access the secured resource using the authenticated session.

13. A system comprising:
one or more computers; and
one or more computer-readable media storing instructions that, when executed by the one or more computers, cause the one or more computers to perform operations comprising:
  receiving, by the one or more computers, data indicating a current context of a client device associated with a particular user;
  accessing, by the one or more computers, first authentication data that demonstrates that the particular user has been authenticated using a first authentication protocol;
  determining, by the one or more computers, that the particular user is likely to request access to a secured resource based on the current context of the client device and data indicating one or more previous resource accesses by the particular user;
  accessing a stored resource profile for the secured resource, the stored resource profile indicating authentication requirements of the secured resource;
  determining, by the one or more computers, that access to the secured resource involves authentication using a second authentication protocol that is different from the first authentication protocol;
  accessing, by the one or more computers, attribute data for the particular user, the attribute data describing attributes of at least one of the client device or a user account of the particular user;
  in response to determining that the particular user is likely to request access to the secured resource and based on the first authentication data demonstrating that the particular user has been authenticated using the first authentication protocol:
    generating, by the one or more computers, an authentication request for the particular user to access the secured resource, the authentication request being generated using attributes selected from the attribute data based on the stored resource profile;
    using, by the one or more computers, the generated authentication request to authenticate the particular user using the second authentication protocol; and
    establishing, by the one or more computers, an authenticated session for the particular user to access the secured resource.

14. The system of claim 13, wherein accessing the first authentication data comprises receiving a Kerberos ticket for an authenticated Kerberos session of the particular user in a local area network domain; and
  wherein the secured resource is a resource outside the local area network domain.

15. The system of claim 13, wherein determining that access to the secured resource involves authentication using a second authentication protocol comprises determining that access to the secured resource comprises authentication using at least one of Open Authentication protocol, Security Assertion Markup Language (SAML), OpenID connect (OIDC), JSON Web Tokens (JWT), or Open Web Application Security Project (OWASP).

16. The system of claim 15, wherein the first authentication data comprises a Kerberos ticket, from a Kerberos key distribution center, that is currently valid, the Kerberos ticket being stored by the one or more computers on behalf of the client device; and
  wherein the authentication is established by the one or more computers using second authentication data for the particular user that comprises at least one of biometric data, a user name, a user account identifier, a device identifier for the client device, a password, a personal identification number, a code, or a data token.

17. The system of claim 13, wherein the secured resource comprises a data source, a document, a web page, a network-based application, a network-based service, or a remote computer system.

18. The system of claim 13, wherein determining that access to the secured resource involves authentication using a second authentication protocol comprises:
  determining that the secured resource is outside a domain of the client device, the one or more computers, or a key distribution center for the first authentication protocol the KDC; and
  determining, based on a stored profile for the secured resource or communication with the secured resource, that the first authentication protocol is not supported by the secured resource but the second authentication protocol is supported by the secured resource, or
  determining, based on a management profile, that a management policy directs use of the second authentication protocol in addition to requirements of the secured resource.

19. The system of claim 13, comprising:
  before receiving the request from the client device to access the secured resource:
    establishing the authenticated session for the particular user with the secured resource; and
    storing session data describing the authenticated session for the particular user to access the secured resource; and
  providing the stored session data to the client device in response to receiving a request from the client device to access the secured resource.

20. One or more non-transitory computer-readable media storing instructions that are operable, when executed by the one or more computers, cause the one or more computers to perform operations comprising:
  receiving, by the one or more computers, data indicating a current context of a client device associated with a particular user;
  accessing, by the one or more computers, first authentication data that demonstrates that the particular user has been authenticated using a first authentication protocol;
  determining, by the one or more computers, that the particular user is likely to request access to a secured resource based on the current context of the client device and data indicating one or more previous resource accesses by the particular user;
  accessing a stored resource profile for the secured resource, the stored resource profile indicating authentication requirements of the secured resource;
  determining, by the one or more computers, that access to the secured resource involves authentication using a second authentication protocol that is different from the first authentication protocol;
  accessing, by the one or more computers, attribute data for the particular user, the attribute data describing attributes of at least one of the client device or a user account of the particular user;

in response to determining that the particular user is likely to request access to the secured resource and based on the first authentication data demonstrating that the particular user has been authenticated using the first authentication protocol:
generating, by the one or more computers, an authentication request for the particular user to access the secured resource, the authentication request being generated using attributes selected from the attribute data based on the stored resource profile;
using, by the one or more computers, the generated authentication request to authenticate the particular user using the second authentication protocol; and
establishing, by the one or more computers, an authenticated session for the particular user to access the secured resource.

\* \* \* \* \*